United States Patent
Chia (10) Patent No.: US 8,027,178 B1
(45) Date of Patent: Sep. 27, 2011

(54) POWER CONVERSION APPARATUS WITH ADJUSTABLE LEB TIME AND OVER CURRENT PROTECTION METHOD THEREOF

(75) Inventor: Ju-Lin Chia, Hsinchu (TW)

(73) Assignee: Power Forest Technology Corporation, Hsinchu (TW)

( * ) Notice: Subject to any disclaimer, the term of this patent is extended or adjusted under 35 U.S.C. 154(b) by 0 days.

(21) Appl. No.: 12/846,833

(22) Filed: Jul. 30, 2010

(30) Foreign Application Priority Data

Jul. 19, 2010 (TW) ................. 99123634 A (51) Int. Cl.
*H02H 7/122* (2006.01)
(52) U.S. Cl. ........................ 363/56.1
(58) Field of Classification Search ......... 363/56.1, 363/21.01; 361/93.1
See application file for complete search history.

(56) References Cited

U.S. PATENT DOCUMENTS

| | | | | |
|---|---|---|---|---|
| 7,151,679 B2 * | 12/2006 | Strijker | ........... | 363/21.01 |
| 7,391,629 B2 * | 6/2008 | Ryu et al. | ........... | 363/56.1 |
| 7,411,374 B2 * | 8/2008 | Tan et al. | ........... | 320/166 |

* cited by examiner

*Primary Examiner* — Shawn Riley
(74) *Attorney, Agent, or Firm* — Jianq Chyun IP Office (57) ABSTRACT

A power conversion apparatus with adjustable leading-edge-blanking (LEB) time and an over current protection (OCP) method thereof are provided. In the OCP method, a pulse-width-modulation (PWM) signal is generated according to the loading status of an electronic device to switch a power switch in the power conversion apparatus and thus the power conversion apparatus to supply an output voltage to the electronic device. A variable or fixed LEB signal is generated according to the PWM signal and the rising and falling edges of a spike signal induced at turn-on instant of the power switch. The PWM signal is constantly/continuously generated to switch the power switch during an enabling period/phase of the variable or fixed LEB signal, and whether an over current is produced in the power conversion apparatus is constantly detected to determine whether to activate an OCP mechanism during a disabling period/phase of the variable or fixed LEB signal.

14 Claims, 5 Drawing Sheets

POWER CONVERSION APPARATUS WITH ADJUSTABLE LEB TIME AND OVER CURRENT PROTECTION METHOD THEREOF

CROSS-REFERENCE TO RELATED APPLICATION

This application claims the priority benefit of Taiwan application serial no. 99123634, filed on Jul. 19, 2010. The entirety of the above-mentioned patent application is hereby incorporated by reference herein and made a part of this specification.

BACKGROUND OF THE INVENTION

1. Field of the Invention

The present invention generally relates to a power conversion apparatus, and more particularly, to a power conversion apparatus with a leading edge blanking (LEB) function for preventing an over current protection (OCP) mechanism from being activated/triggered incorrectly.

2. Description of Related Art

A power conversion apparatus is capable of converting the high and instable AC input voltage supplied by an electric utility into a low and stable DC output voltage suitable for an electronic device. Thus, power conversion apparatuses have been broadly applied to different electronic devices, such as computers, office automation equipments, industrial control equipments, and communication equipments.

Figure 1:
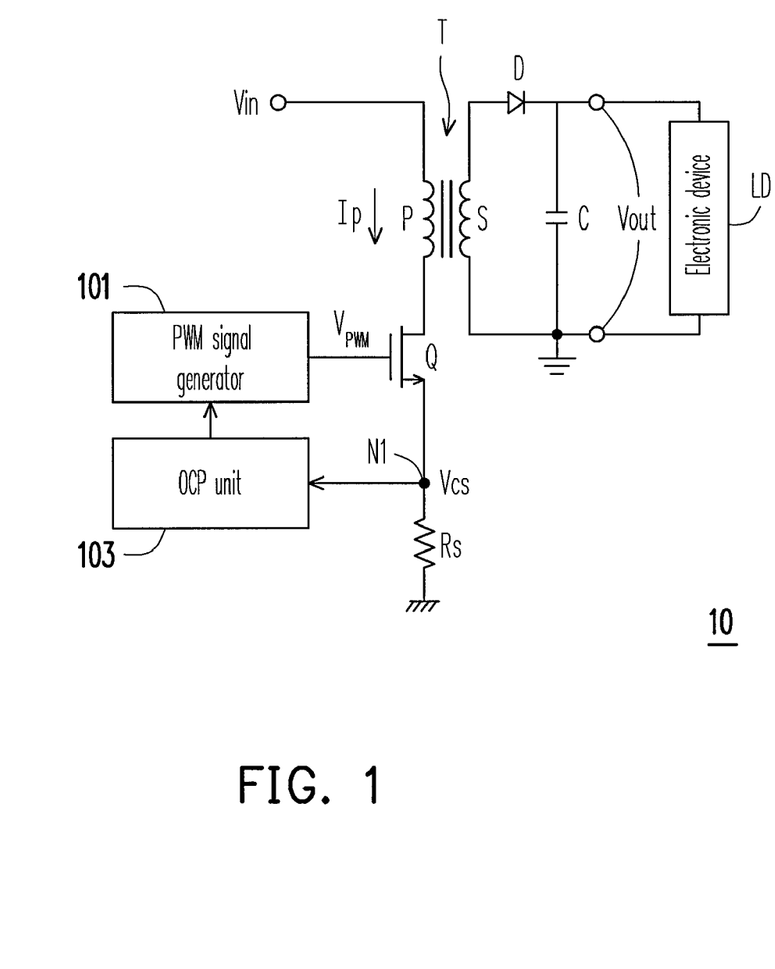
FIG. 1 is a diagram of a conventional power conversion apparatus 10.

FIG. 1 is a diagram of a conventional power conversion apparatus 10. Referring to FIG. 1, the pulse width modulation (PWM) signal generator 101 outputs a PWM signal $V_{PWM}$ to switch (i.e., turn on and off) the power switch Q. Accordingly, the AC voltage (determined by the turn ratio between the primary side P and the secondary side S of the transformer T) at the secondary side S of the transformer T corresponding to the AC input voltage Vin received by the primary side P of the transformer T is converted into a DC output voltage Vout through rectification of the diode D and filtering of the capacitor C and supplied to the electronic device LD.

However, if the current Ip flowing through the primary side P of the transformer T is too large (i.e., an over current is produced), the power switch Q and/or the electronic device LD may be damaged. Conventionally, an over current protection (OCP) unit 103 is disposed in the power conversion apparatus 10 for detecting the voltage Vcs (Vcs=Rs×Ip) on the node N1 between the power switch Q and the resistor Rs. When the voltage Vcs on the node N1 reaches a predetermined OCP reference voltage of the OCP unit 103, the OCP unit 103 activates an OCP mechanism to stop the PWM signal generator 101 from outputting the PWM signal $V_{PWM}$ and turn off the power switch Q, so that the power switch Q and/or the electronic device LD can be protected.

However, a spike may be produced at the instant when the power switch Q is turned on because of (in response to) the PWM signal $V_{PWM}$, and as a result, the voltage Vcs on the node N1 detected by the OCP unit 103 may be very high (or may even reach the predetermined OCP reference voltage of the OCP unit 103) at that instant. Thus, the OCP unit 103 may activate/trigger the OCP mechanism incorrectly. In this case, the power switch Q is turned off when no over current is produced in the power conversion apparatus 10, and accordingly, the power conversion apparatus 10 cannot supply the DC output voltage Vout to the electronic device LD as expected.

SUMMARY OF THE INVENTION

Accordingly, the present invention is directed to a power conversion apparatus with a leading edge blanking (LEB) function for preventing an over current protection (OCP) mechanism from being activated/triggered incorrectly.

The present invention provides a power conversion apparatus including a transformer, a power switch, a resistor, a LEB unit, a pulse width modulation (PWM) signal generator, and an OCP unit. The transformer has a primary side and a secondary side, wherein a first terminal of the primary side receives an input voltage, and the secondary side supplies an output voltage to an electronic device. A first terminal of the power switch is coupled to a second terminal of the primary side of the transformer, and a control terminal of the power switch receives a PWM signal.

The resistor is coupled between a second terminal of the power switch and the ground voltage. The LEB unit is coupled to a first node between the resistor and the second terminal of the power switch, and which generates a variable or fixed LEB signal according to the rising and falling edges of a spike signal on the first node and the PWM signal. The PWM signal generator is coupled to the control terminal of the power switch and the LEB unit, and which generates and modulates the PWM signal according to the loading status of the electronic device.

The OCP unit is coupled to the LEB unit and the PWM signal generator. The OCP unit receives the variable or fixed LEB signal. The OCP unit controls the PWM signal generator to constantly (continuously) generate the PWM signal during an enabling period/phase of the variable or fixed LEB signal and constantly detects the voltage on the first node to determine whether to activate an OCP mechanism during a disabling period/phase of the variable or fixed LEB signal.

The present invention also provides an OCP method suitable for a power conversion apparatus. The OCP method includes following steps. A PWM signal is generated according to the loading status of an electronic device so as to switch a power switch in the power conversion apparatus and thus the power conversion apparatus to supply an output voltage to the electronic device. A variable or fixed LEB signal is generated according to the PWM signal and the rising and falling edges of a spike signal induced at a turn-on instant of the power switch. The PWM signal is constantly (continuously) generated to switch the power switch during an enabling period/phase of the variable or fixed LEB signal, and whether an over current is produced in the power conversion apparatus is constantly detected to determine whether to activate an OCP mechanism during a disabling period/phase of the variable or fixed LEB signal.

As described above, the present invention provides a power conversion apparatus and an OCP method thereof, wherein the time for a LEB unit to generate a LEB signal is adaptively adjusted by detecting the rising and falling edges of a spike signal induced at the turn-on instant of a power switch. The LEB unit is controlled to generate a variable LEB signal when the voltage level of the spike signal reaches a predetermined OCP reference voltage of an OCP unit, so that the power switch is prevented from being damaged due to long LEB time. On the other hand, the LEB unit is controlled to generate a fixed LEB signal when the voltage level of the spike signal has not reached the predetermined OCP reference voltage of the OCP unit, so that the OCP unit is prevented from activating/triggering an OCP mechanism incorrectly.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
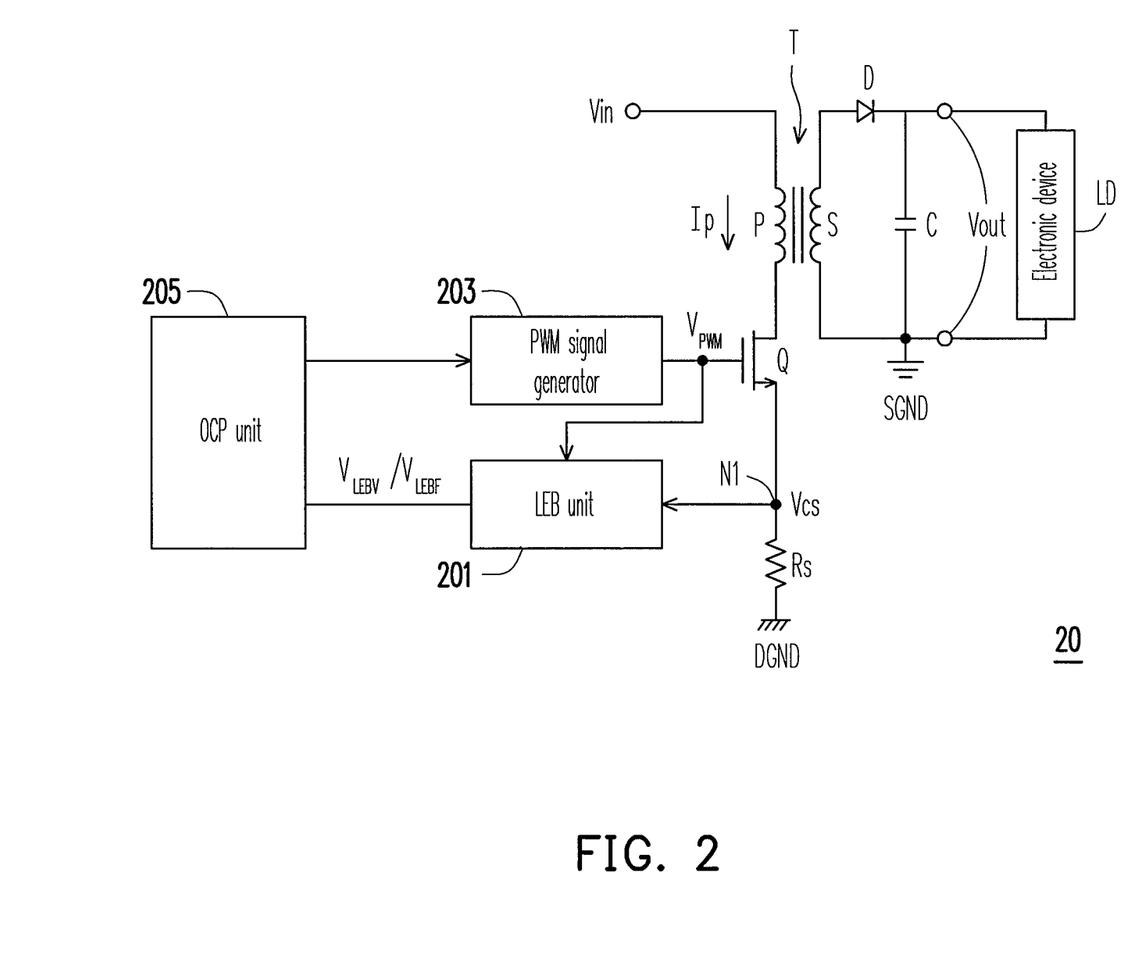
FIG. 2 is a diagram of a power conversion apparatus 20 according to an embodiment of the present invention.

FIG. 2 is a diagram of a power conversion apparatus 20 according to an embodiment of the present invention. Referring to FIG. 2, the power conversion apparatus 20 includes a transformer T, a power switch Q, a resistor Rs, a leading edge blanking (LEB unit) 201, a pulse width modulation (PWM) signal generator 203, an over current protection (OCP) unit 205, a diode D, and a capacitor C.

In the present embodiment, the transformer T has a primary side P and a secondary side S. The first terminal of the primary side P of the transformer T receives an input voltage Vin, and the secondary side S of the transformer T supplies an output voltage Vout to an electronic device LD.

Generally speaking, the input voltage Vin is an AC input voltage. Thus, the AC voltage (determined by the turn ratio between the primary side P and the secondary side S of the transformer T) at the secondary side S of the transformer T corresponding to the AC input voltage Vin received by the primary side P of the transformer T has to rectified by the diode D and filtered by the capacitor C to be converted into the DC output voltage Vout desired by the electronic device LD. Conventionally, the anode of the diode D is coupled to the first terminal of the secondary side S of the transformer T, and the cathode of the diode D is coupled to the electronic device LD. Moreover, the first end of the capacitor C is coupled to the cathode of the diode D, and the second end of the capacitor C is coupled to the second terminal of the secondary side S of the transformer T and a ground voltage SGND (i.e., safety ground).

In the present embodiment, the first terminal of the power switch Q (may be an N-type transistor) is coupled to the second terminal of the primary side P of the transformer T, and the control terminal of the power switch Q receives a PWM signal $V_{PWM}$. The resistor Rs is coupled between the second terminal of the power switch Q and a ground voltage DGND (i.e., dangerous ground). The LEB unit 201 is coupled to the node N1 between the resistor Rs and the second terminal of the power switch Q, and which generates a variable or fixed LEB signal $V_{LEBV}/V_{LEBF}$ according to the rising and falling edges of a spike signal (induced at the instant when the power switch Q is turned on in response to the PWM signal $V_{PWM}$) on the node N1 and the PWM signal $V_{PWM}$.

The PWM signal generator 203 is coupled to the control terminal of the power switch Q and the LEB unit 201, and which generates and modulates the PWM signal $V_{PWM}$ according to the loading status of the electronic device LD.

The OCP unit 205 is coupled to the LEB unit 201 and the PWM signal generator 203 and receives the variable or fixed LEB signal $V_{LEBV}/V_{LEBF}$ from the LEB unit 201. The OCP unit 205 controls the PWM signal generator 203 to constantly (continuously) generate the PWM signal $V_{PWM}$ during an enabling period/phase of the variable or fixed LEB signal $V_{LEBV}/V_{LEBF}$ and constantly detects the voltage Vcs (Vcs=Rs×Ip, wherein Ip is the current flowing through the primary side P of the transformer T, and Rs is the resistance of the resistor Rs) on the node N1, so as to determine whether to activate/trigger an OCP mechanism, during a disabling period/phase of the variable or fixed LEB signal $V_{LEBV}/V_{LEBF}$.

Referring to the description of related art in the present disclosure and FIG. 1, a spike may be produced at the instant when the power switch Q is turned on because of the PWM signal $V_{PWM}$, and as a result, the voltage Vcs on the node N1 detected by the OCP unit 103 may be very high (or may even reach the predetermined OCP reference voltage of the OCP unit 103) at that instant. Thus, the OCP unit 103 may activate/trigger the OCP mechanism incorrectly. In this case, the power switch Q is turned off when no over current is produced in the power conversion apparatus 10, and accordingly, the power conversion apparatus 10 cannot supply the DC output voltage Vout to the electronic device LD as expected.

Accordingly, in the present embodiment, the LEB unit 201 is especially adopted for detecting the rising and falling edges of the spike signal (induced at the instant when the power switch Q is turned on because of the PWM signal $V_{PWM}$) on the node N1, so as to adaptively adjust the time for the LEB unit 201 to generate the LEB signal. When the voltage level of the spike signal on the node N1 reaches the predetermined OCP reference voltage $V_{OCP}$ (will be explained in detail thereinafter) of the OCP unit 205, the LEB unit 201 is controlled to generate the variable LEB signal $V_{LEBV}$ (will be explained in detail thereinafter).

On the other hand, when the voltage level of the spike signal on the node N1 has not reached the predetermined OCP reference voltage $V_{OCP}$ of the OCP unit 205, the LEB unit 201 is controlled to generate the fixed LEB signal $V_{LEBF}$ (will be explained in detail thereinafter). Accordingly, the OCP unit 205 can activate/trigger the OCP mechanism correctly so that internal components of the power conversion apparatus 20 and the electronic device LD can be effectively protected.

Figure 3:
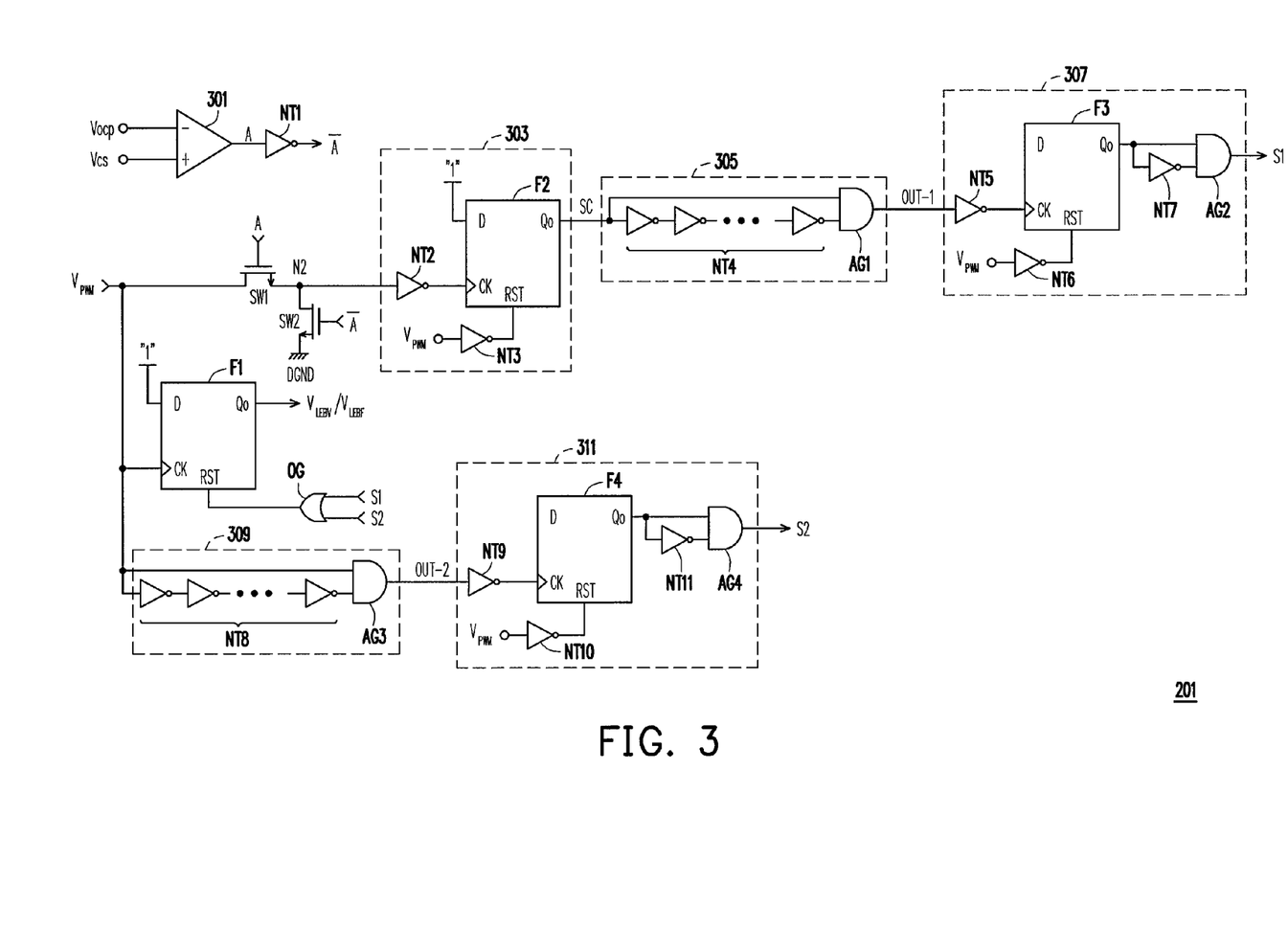
FIG. 3 is a diagram of a leading edge blanking (LEB) unit 201 according to an embodiment of the present invention.

FIG. 3 is a diagram of the LEB unit 201 according to an embodiment of the present invention. Referring to both FIG. 2 and FIG. 3, the LEB unit 201 includes a comparator 301, an invertor NT1, a first switch SW1 and a second switch SW2 (may both be N-type transistors), an activation control unit 303, a first delay cell 305, a first one shot unit 307, a second delay cell 309, a second one shot unit 311, an OR gate OG, and a D flip-flop (D-FF) F1.

In the present embodiment, the negative input terminal (−) (i.e., inverting input terminal) of the comparator 301 receives the predetermined OCP reference voltage $V_{OCP}$ of the OCP unit 205, the positive input terminal (+) (i.e., non-inverting input terminal) of the comparator 301 is coupled to the node N1, and the output terminal of the comparator 301 outputs a comparison signal A relating to the rising and falling edges of the spike signal (i.e., the voltage Vcs) on the node N1.

The invertor NT1 is coupled to the comparator 301 for receiving and inverting the comparison signal A output by the comparator 301. In other words, the input terminal of the invertor NT1 receives the comparison signal A, and the output terminal of the invertor NT1 outputs a comparison signal $\overline{A}$, wherein the comparison signal $\overline{A}$ and the comparison signal A have a phase difference of 180°. The first terminal of the switch SW1 receives the PWM signal $V_{PWM}$ generated by the PWM signal generator 203, the second terminal of the switch SW1 is coupled to a node N2, and the control terminal of the switch SW1 receives the comparison signal A from the comparator 301. The first terminal of the switch SW2 is coupled to the node N2, the second terminal of the switch SW2 is coupled to the ground voltage DGND, and the control terminal of the switch SW2 receives the comparison signal $\overline{A}$ from the invertor NT1.

The activation control unit 303 is coupled to the node N2, and which determines whether to generate an activation signal SC according to the variation of the signal on the node N2 and the PWM signal $V_{PWM}$ generated by the PWM signal generator 203. In the present embodiment, the activation control unit 303 includes invertors NT2 and NT3 and a D-FF F2. The input terminal of the invertor NT2 is coupled to the node N2. The input terminal of the invertor NT3 receives the PWM signal $V_{PWM}$ from the PWM signal generator 203. The data input terminal D of the D-FF F2 is coupled to the high logic level "1", the clock input terminal CK of the D-FF F2 is coupled to the output terminal of the invertor NT2, the reset terminal RST of the D-FF F2 is coupled to the output terminal of the invertor NT3, and the data output terminal Qo of the D-FF F2 outputs the activation signal SC.

The first delay cell 305 is coupled to the activation control unit 303. The first delay cell 305 receives and delays the activation signal SC generated by the activation control unit 303 and outputs a delay signal OUT-1. In the present embodiment, the first delay cell 305 includes an odd number of invertors NT4 and an AND gate AG1. The invertors NT4 are connected with each other in series for receiving and delaying the activation signal SC generated by the activation control unit 303. The first input terminal of the AND gate AG1 receives the activation signal SC from the activation control unit 303, the second input terminal of the AND gate AG1 receives the activation signal SC delayed by the invertors NT4, and the output terminal of the AND gate AG1 outputs the delay signal OUT-1.

The first one shot unit 307 is coupled to the first delay cell 305, and which determines whether to generate a first trigger signal S1 according to the output of the first delay cell 305. In the present embodiment, the first one shot unit 307 includes invertors NT5-NT7, a D-FF F3, and an AND gate AG2. The input terminal of the invertor NT5 is coupled to the output terminal of the AND gate AG1. The input terminal of the invertor NT6 receives the PWM signal $V_{PWM}$ from the PWM signal generator 203. The data input terminal D of the D-FF F3 is coupled to the high logic level "1", the clock input terminal CK of the D-FF F3 is coupled to the output terminal of the invertor NT5, and the reset terminal RST of the D-FF F3 is coupled to the output terminal of the invertor NT6. The input terminal of the invertor NT7 is coupled to the data output terminal Qo of the D-FF F3. The first input terminal of the AND gate AG2 is coupled to the data output terminal Qo of the D-FF F3, the second input terminal of the AND gate AG2 is coupled to the output terminal of the invertor NT7, and the output terminal of the AND gate AG2 outputs the first trigger signal S1.

The second delay cell 309 receives and delays the PWM signal $V_{PWM}$ generated by the PWM signal generator 203 and outputs a second delay signal OUT-2. In the present embodiment, the second delay cell 309 includes an odd number of invertors NT8 and an AND gate AG3. The invertors NT8 are connected with each other in series for receiving and delaying the PWM signal $V_{PWM}$ generated by the PWM signal generator 203. The first input terminal of the AND gate AG3 receives the PWM signal $V_{PWM}$ from the PWM signal generator 203, the second input terminal of the AND gate AG3 receives the PWM signal $V_{PWM}$ delayed by the invertors NT8, and the output terminal of the AND gate AG3 outputs a delay signal OUT-2.

The second one shot unit 311 is coupled to the second delay cell 309, and which determines whether to generate a second trigger signal S2 according to the output of the second delay cell 309. In the present embodiment, the second one shot unit 311 includes invertors NT9-NT11, a D-FF F4 and an AND gate AG4. The input terminal of the invertor NT9 is coupled to the output terminal of the AND gate AG3. The input terminal of the invertor NT10 receives the PWM signal $V_{PWM}$ from the PWM signal generator 203. The data input terminal D of the D-FF F4 is coupled to the high logic level "1", the clock input terminal CK of the D-FF F4 is coupled to the output terminal of the invertor NT9, and the reset terminal RST of the D-FF F4 is coupled to the output terminal of the invertor NT10. The input terminal of the invertor NT11 is coupled to the data output terminal Qo of the D-FF F4. The first input terminal of the AND gate AG4 is coupled to the data output terminal Qo of the D-FF F4, the second input terminal of the AND gate AG4 is coupled to the output terminal of the invertor NT11, and the output terminal of the AND gate AG4 outputs the second trigger signal S2.

The first input terminal of the OR gate OG receives the first trigger signal S1 from the first one shot unit 307, and the second input terminal of the OR gate OG receives the second trigger signal S2 from the second one shot unit 311. The data input terminal D of the D-FF F1 is coupled to the high logic level "1", the clock input terminal CK of the D-FF F1 receives the PWM signal $V_{PWM}$ from the PWM signal generator 203, the reset terminal RST of the D-FF F1 is coupled to the output terminal of the OR gate OG, and the data output terminal Qo of the D-FF F1 outputs the variable Or fixed LEB signal $V_{LEBV}/V_{LEBF}$.

In the present embodiment, when the comparison signal A output by the comparator 301 is enabled (i.e., transit from a low voltage level to a high voltage level and then from the high voltage level back to the low voltage level) during a predetermined time (will be explained in detail thereinafter), the LEB unit 201 generates the variable LEB signal $V_{LEBV}$. Contrarily, when the comparison signal A output by the comparator 301 is always disabled (i.e., remains at the low voltage level) during the predetermined time, the LEB unit 201 generates the fixed LEB signal $V_{LEBF}$.

On the other hand, during a disabling period/phase of the variable or fixed LEB signal $V_{LEBV}/V_{LEBF}$, when the voltage Vcs on the node N1 reaches the predetermined OCP reference voltage $V_{OCP}$ of the OCP unit 205, the OCP unit 205 activates an OCP mechanism to stop the PWM signal generator 203 from generating the PWM signal $V_{PWM}$, so that the switching (i.e., turning on and off) of the power switch Q is stopped. Accordingly, the power switch Q and/or the electronic device LD are protected.

In addition, during the disabling period/phase of the variable or fixed LEB signal $V_{LEBV}/V_{LEBF}$, when the voltage Vcs on the node N1 does not reach the predetermined OCP reference voltage $V_{OCP}$ of the OCP unit 205, the OCP unit 205 stops activating the OCP mechanism, so that the PWM signal generator 203 keeps generating the PWM signal $V_{PWM}$ and the power switch Q is switched (i.e., turned on and off) continuously. As a result, the power conversion apparatus 20 supplies the DC output voltage Vout to the electronic device LD continuously.

Figure 4:
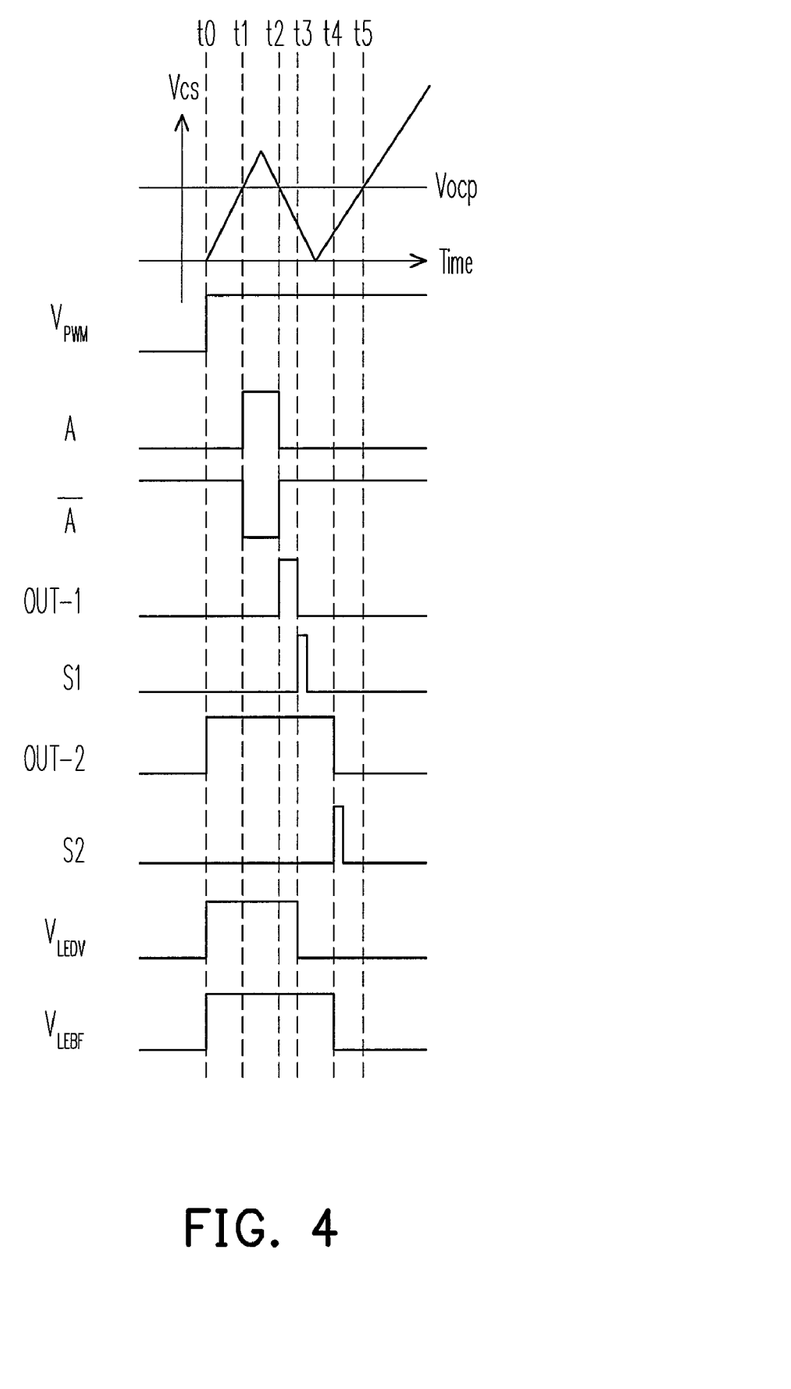
FIG. 4 is a diagram illustrating the operation of a LEB unit 201 according to an embodiment of the present invention.

FIG. 4 is a diagram illustrating the operation of the LEB unit 201 according to an embodiment of the present invention. Referring to FIGS. 2-4, in the present embodiment, it is assumed that the voltage Vcs on the node N1 produces a spike at the instant when the power switch Q is turned on in response to the PWM signal $V_{PWM}$ (for example, the time duration t0-t2). In this case, before time t0, because the PWM signal $V_{PWM}$ generated by the PWM signal generator 203 is at a low voltage level and the voltage Vcs on the node N1 is lower than the predetermined OCP reference voltage $V_{OCP}$ of the OCP unit 205, the comparison signal A is in a disabled state, and all of the D-FFs F2-F4 are reset.

During time t0-t1, because the PWM signal $V_{PWM}$ generated by the PWM signal generator 203 is at a high voltage level and the voltage Vcs on the node N1 is lower than the predetermined OCP reference voltage $V_{OCP}$ of the OCP unit 205, the comparison signal A is still in the disabled state, and herein the activation control unit 303 does not output the activation signal SC, and the delay signal OUT-2 output by the second delay cell 309 is enabled. Besides, herein the D-FF F1 is triggered therefore starts to output a high level voltage.

During time t1-t2 (i.e., at the rising and falling edges of the spike signal on the node N1), because the PWM signal $V_{PWM}$ generated by the PWM signal generator 203 remains at the high voltage level but the voltage Vcs on the node N1 is higher than the predetermined OCP reference voltage $V_{OCP}$ of the OCP unit 205, the comparison signal A is enabled, and the delay signal OUT-2 output by the second delay cell 309 remains enabled.

During time t2-t3, because the PWM signal $V_{PWM}$ generated by the PWM signal generator 203 remains at the high voltage level but the voltage Vcs on the node N1 is lower than the predetermined OCP reference voltage $V_{OCP}$ of the OCP unit 205, the comparison signal A is disabled, and herein the activation control unit 303 outputs the activation signal SC to enable the delay signal OUT-1 output by the first delay cell 305 (the enabled time thereof is determined by the number of the invertors NT4).

During time t3-t4, because the PWM signal $V_{PWM}$ generated by the PWM signal generator 203 remains at the high voltage level, the voltage Vcs on the node N1 is lower than the predetermined OCP reference voltage $V_{OCP}$ of the OCP unit 205, and the delay signal OUT-1 output by the first delay cell 305 is disabled, the first one shot unit 307 outputs the first trigger signal S1 to the OR gate OG at the beginning of the duration t3-t4, so as to reset the D-FF F1 and allow the D-FF F1 to output a low level voltage.

Accordingly, even though the intensity of the spike produced by the voltage Vcs on the node N1 during time t1-t2 has reached the predetermined OCP reference voltage $V_{OCP}$ of the OCP unit 205, because the D-FF F1 outputs the enabled variable LEB signal $V_{LEBV}$ during time t043, the OCP unit 205 does not activate/trigger the OCP mechanism so that the PWM signal generator 203 still continuously outputs the PWM signal $V_{PWM}$ to switch the power switch Q. Namely, the OCP unit 205 does not trigger/activate the OCP mechanism to turn off the power switch Q when no over current is actually produced in the power conversion apparatus 20.

It should be mentioned that because the intensity of the spike produced by the voltage Vcs on the node N1 during time t0-t2 changes along with the loading status of the electronic device LD, the time for the voltage Vcs on the node N1 to reach the predetermined OCP reference voltage $V_{OCP}$ of the OCP unit 205 during time t1-t2 (i.e., the length of the time duration t1-t2) also changes. Accordingly, the enabling time (herein can be referred to as the time of the LEB signal) of the variable LEB signal $V_{LEBV}$ output by the D-FF F1 during time t0-t3 also changes (may be longer or shorter), and this is why the variable LEB signal $V_{LEBV}$ is referred to as a "variable" signal.

On the other hand, if the intensity of the spike (i.e., the voltage level of the voltage Vcs) produced by the voltage Vcs on the node N1 during time t0-t2 does not reach the predetermined OCP reference voltage $V_{OCP}$ of the OCP unit 205, the comparison signal A remains in the disabled state, and the D-FF F1 continuously outputs a high level voltage until the second one shot unit 311 outputs the second trigger signal S2 to the OR gate OG during time t4-t5 to reset the D-FF F1 when the OR gate OG is disabled during time t4-t5 because of the delay signal OUT-2 output by the second delay cell 309. Accordingly, the D-FF F1 starts to output a low level voltage. Similarly, the enabling time of the delay signal OUT-2 output by the second delay cell 309 is determined by the number of the invertors NT8.

Thereby, even though the intensity of the spike produced by the voltage Vcs on the node N1 during time t0-t2 does not reach the predetermined OCP reference voltage $V_{OCP}$ of the OCP unit 205, because the D-FF F1 outputs the enabled fixed LEB signal $V_{LEBF}$ during time t0-t4 (i.e., aforementioned predetermined time), the OCP unit 205 does not activate/trigger the OCP mechanism so that the PWM signal generator 203 continuously outputs the PWM signal $V_{PWM}$ to switch the power switch Q. Namely, the OCP unit 205 does not activate/trigger the OCP mechanism to turn off the power switch Q when no over current is actually produced in the power conversion apparatus 20.

Similarly, because the intensity of the spike produced by the voltage Vcs on the node N1 during time t042 changes along with the loading status of the electronic device LD, if the level of the voltage Vcs on the node N1 does not reach the predetermined OCP reference voltage $V_{OCP}$ of the OCP unit 205 during time t042, the D-FF F1 outputs the fixed LEB signal $V_{LEBF}$ with constant enabling time (herein can be considered as the time of the LEB signal) during time t0-t4, and this is why the fixed LEB signal $V_{LEBF}$ is referred to as a "fixed" signal.

Additionally, assuming that the voltage Vcs on the node N1 reaches the predetermined OCP reference voltage $V_{OCP}$ of the OCP unit 205 after time t4 (i.e., during the disabling period/phase of the variable or fixed LEB signal $V_{LEBV}$/$V_{LEBF}$, and for example, at time t5), the OCP unit 205 activates/triggers the OCP mechanism to turn off the power switch Q, so as to protect the power switch Q and/or the electronic device LD when an over current is actually produced in the power conversion apparatus 20.

An OCP method suitable for a power conversion apparatus will be described herein based on the embodiments described above so that those having ordinary knowledge in the art can implement the present invention by referring to the present disclosure.

Figure 5:
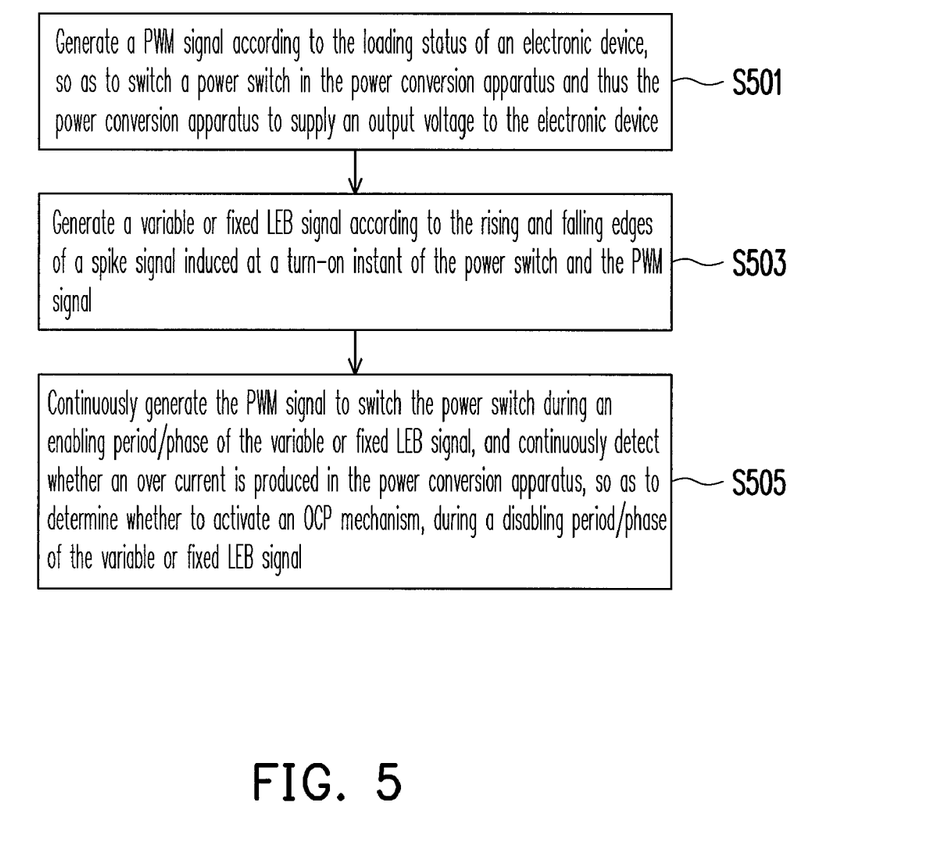
FIG. 5 is a flowchart of an over current protection (OCP) method suitable for a power conversion apparatus according to an embodiment of the present invention.

FIG. 5 is a flowchart of an OCP method suitable for a power conversion apparatus according to an embodiment of the present invention. Referring to FIG. 5, the OCP method in the present embodiment includes following steps. A PWM signal is generated according to the loading status of an electronic device, so as to switch a power switch in the power conversion apparatus and thus the power conversion apparatus to supply an output voltage to the electronic device (step S501). A variable or fixed LEB signal is generated according to the rising and falling edges of a spike signal induced at a turn-on instant of the power switch and the PWM signal (step S503). The PWM signal is continuously generated to switch the power switch during an enabling period/phase of the variable or fixed LEB signal, and whether an over current is produced in the power conversion apparatus is continuously detected, so as to determine whether to activate an OCP mechanism, during a disabling period/phase of the variable or fixed LEB signal (step S505).

The step S503 for generating the variable or fixed LEB signal further includes following steps. A predetermined OCP reference voltage is compared with the spike signal to generate a comparison signal relating to the rising and falling edges of the spike signal. The variable or fixed LEB signal is generated according to whether the comparison signal is enabled and the PWM signal. In the present embodiment, the variable LEB signal is generated when the comparison signal is enabled during a predetermined time, and the fixed LEB signal is generated when the comparison signal remains disabled during the predetermined time.

On the other hand, in step S505, during the disabling period/phase of the variable or fixed LEB signal, the OCP mechanism is activated when an over current is produced in the power conversion apparatus. Contrarily, during the disabling period/phase of the variable or fixed LEB signal, the OCP mechanism is not activated when no over current is produced in the power conversion apparatus.

In summary, the present invention provides a power conversion apparatus and an OCP method thereof, wherein the time of a LEB signal generated by a LEB unit is adaptively adjusted by detecting the rising and falling edges of a spike signal induced at a turn-on instant of a power switch. Once the voltage level of the spike signal reaches the predetermined OCP reference voltage of an OCP unit, the LEB unit generates a variable LEB signal, such that the power switch is protected from being damaged by long LEB time. On the other hand, when the voltage level of the spike signal does not reach the predetermined OCP reference voltage of the OCP unit, the LEB unit generates the fixed LEB signal such that the OCP unit won't activate/trigger the OCP mechanism incorrectly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power conversion apparatus, comprising:
   a transformer, having a primary side and a secondary side, wherein a first terminal of the primary side receives an input voltage, and the secondary side supplies an output voltage to an electronic device;
   a power switch, having a first terminal coupled to a second terminal of the primary side and a control terminal for receiving a pulse width modulation (PWM) signal;
   a resistor, coupled between a second terminal of the power switch and a ground voltage;
   a leading edge blanking (LEB) unit, coupled to a first node between the resistor and the second terminal of the power switch, for generating a variable or fixed LEB signal according to rising and falling edges of a spike signal on the first node and the PWM signal;
   a PWM signal generator, coupled to the control terminal of the power switch and the LEB unit, for generating and modulating the PWM signal according to a loading status of the electronic device; and
   an over current protection (OCP) unit, coupled to the LEB unit and the PWM signal generator, for receiving the variable or fixed LEB signal, and for controlling the PWM signal generator to constantly generate the PWM signal during an enabling period/phase of the variable or fixed LEB signal and determining whether to activate an OCP mechanism by constantly detecting a voltage on the first node during a disabling period/phase of the variable or fixed LEB signal.

2. The power conversion apparatus according to claim 1, wherein the LEB unit comprises:
   a comparator, having a negative input terminal for receiving a predetermined OCP reference voltage, a positive input terminal coupled to the first node, and an output terminal for outputting a comparison signal relating to the rising and falling edges of the spike signal;
   a first invertor, coupled to the comparator, for receiving and inverting the comparison signal;
   a first switch, having a first terminal for receiving the PWM signal, a second terminal coupled to a second node, and a control terminal for receiving the comparison signal;
   a second switch, having a first terminal coupled to the second node, a second terminal coupled to the ground voltage, and a control terminal for receiving the inverted comparison signal;
   a activation control unit, coupled to the second node, for determining whether to generate an activation signal according to a variation of a signal on the second node and the PWM signal;
   a first delay cell, coupled to the activation control unit, for receiving and delaying the activation signal so as to output a first delay signal;
   a first one shot unit, coupled to the first delay cell, for determining whether to generate a first trigger signal according to an output of the first delay cell;
   a second delay cell, for receiving and delaying the PWM signal so as to output a second delay signal;
   a second one shot unit, coupled to the second delay cell, for determining whether to generate a second trigger signal according to an output of the second delay cell;
   an OR gate, having a first input terminal for receiving the first trigger signal and a second input terminal for receiving the second trigger signal; and
   a first D flip-flop (D-FF), having a data input terminal coupled to a high logic level, a clock input terminal for receiving the PWM signal, a reset terminal coupled to an output terminal of the OR gate, and a data output terminal for outputting the variable or fixed LEB signal.

3. The power conversion apparatus according to claim 2, wherein the activation control unit comprises:
   a second invertor, having an input terminal coupled to the second node;
   a third invertor, having an input terminal for receiving the PWM signal; and
   a second D-FF, having a data input terminal coupled to the high logic level, a clock input terminal coupled to an output terminal of the second invertor, a reset terminal coupled to an output terminal of the third invertor, and a data output terminal for outputting the activation signal.

4. The power conversion apparatus according to claim 3, wherein the first delay cell comprises:
   an odd number of fourth invertors that are connected with each other in series, for receiving and delaying the activation signal; and
   a first AND gate, having a first input terminal for receiving the activation signal, a second input terminal for receiving the activation signal delayed by the fourth invertors, and an output terminal for outputting the first delay signal.

5. The power conversion apparatus according to claim 4, wherein the first one shot unit comprises:

a fifth invertor, having an input terminal coupled to the output terminal of the first AND gate;

a sixth invertor, having an input terminal for receiving the PWM signal;

a third D-FF, having a data input terminal coupled to the high logic level, a clock input terminal coupled to an output terminal of the fifth invertor, and a reset terminal coupled to an output terminal of the sixth invertor;

a seventh invertor, having an input terminal coupled to a data output terminal of the third D-FF; and a second AND gate, having a first input terminal coupled to the data output terminal of the third D-FF, a second input terminal coupled to an output terminal of the seventh invertor, and an output terminal for outputting the first trigger signal to the first input terminal of the OR gate.

6. The power conversion apparatus according to claim 5, wherein the second delay cell comprises:

an odd number of eighth invertors that are connected with each other in series, for receiving and delaying the PWM signal; and a third AND gate, having a first input terminal for receiving the PWM signal, a second input terminal for receiving the PWM signal delayed by the eighth invertors, and an output terminal for outputting the second delay signal.

7. The power conversion apparatus according to claim 6, wherein the second one shot unit comprises:

a ninth invertor, having an input terminal coupled to the output terminal of the third AND gate;

a tenth invertor, having an input terminal for receiving the PWM signal;

a fourth D-FF, having a data input terminal coupled to the high logic level, a clock input terminal coupled to an output terminal of the ninth invertor, and a reset terminal coupled to an output terminal of the tenth invertor;

an eleventh invertor, having an input terminal coupled to a data output terminal of the fourth D-FF; and a fourth AND gate, having a first input terminal coupled to the data output terminal of the fourth D-FF, a second input terminal coupled to an output terminal of the eleventh invertor, and an output terminal for outputting the second trigger signal to the second input terminal of the OR gate.

8. The power conversion apparatus according to claim 2, wherein the LEB unit generates the variable LEB signal when the comparison signal is enabled during a predetermined time; and the LEB unit generates the fixed LEB signal when the comparison signal is constantly disabled during the predetermined time.

9. The power conversion apparatus according to claim 2, wherein during the disabling period/phase of the variable or fixed LEB signal, the OCP unit activates the OCP mechanism when the voltage on the first node reaches the predetermined OCP reference voltage; and the OCP unit stops activating the OCP mechanism when the voltage on the first node does not reach the predetermined OCP reference voltage.

10. The power conversion apparatus according to claim 2, wherein the power switch, the first switch, and the second switch are all N-type transistors.

11. An over current protection (OCP) method, suitable for a power conversion apparatus, the OCP method comprising:

generating a PWM signal according to a loading status of an electronic device to switch a power switch in the power conversion apparatus, and thus the power conversion apparatus to supply an output voltage to the electronic device;

generating a variable or fixed LEB signal according to rising and falling edges of a spike signal induced at a turn-on instant of the power switch and the PWM signal; and continuously generating the PWM signal to switch the power switch during an enabling period/phase of the variable or fixed LEB signal, and constantly detecting whether an over current is produced in the power conversion apparatus to determine whether to activate an OCP mechanism during a disabling period/phase of the variable or fixed LEB signal.

12. The OCP method according to claim 11, wherein the step of generating the variable or fixed LEB signal comprises:

comparing a predetermined OCP reference voltage with the spike signal to generate a comparison signal relating to the rising and falling edges of the spike signal; and generating the variable or fixed LEB signal according to whether the comparison signal is enabled and the PWM signal.

13. The OCP method according to claim 12, wherein generating the variable LEB signal when the comparison signal is enabled during a predetermined time; and generating the fixed LEB signal when the comparison signal is constantly disabled during the predetermined time.

14. The OCP method according to claim 11, wherein activating the OCP mechanism when the over current is produced in the power conversion apparatus; and stopping activating the OCP mechanism when the over current is not produced in the power conversion apparatus.

* * * * *